TWO-WAY ELECTRIC PULSE COMMUNICATION SYSTEM

Filed Nov. 13, 1948 5 Sheets-Sheet 1

INVENTOR.
CHARLES THOMAS SCULLY

BY R. P. Morris

ATTORNEY

TWO-WAY ELECTRIC PULSE COMMUNICATION SYSTEM

Filed Nov. 13, 1948

INVENTOR.
CHARLES THOMAS SCULLY

BY R P Morris

ATTORNEY

INVENTOR.
CHARLES THOMAS SCULLY
BY
R. P. Morris
ATTORNEY

TWO-WAY ELECTRIC PULSE COMMUNICATION SYSTEM

Filed Nov. 13, 1948 5 Sheets-Sheet 4

INVENTOR.
CHARLES THOMAS SCULLY
BY
R. P. Morris
ATTORNEY

Aug. 28, 1951 C. T. SCULLY 2,565,525

TWO-WAY ELECTRIC PULSE COMMUNICATION SYSTEM

Filed Nov. 13, 1948 5 Sheets-Sheet 5

INVENTOR.
CHARLES THOMAS SCULLY

BY [signature]

ATTORNEY

Patented Aug. 28, 1951 2,565,525

UNITED STATES PATENT OFFICE 2,565,525

TWO-WAY ELECTRIC PULSE COMMUNICATION SYSTEM

Charles Thomas Scully, London, England, assignor to International Standard Electric Corporation, New York, N. Y., a corporation of Delaware Application November 13, 1948, Serial No. 59,957
In Great Britain November 26, 1947

13 Claims. (Cl. 179—170)

The present invention relates to two-way repeaters for electric pulses, suitable for cases in which the pulses are transmitted in both directions over the same communication medium.

When a common medium such as a cable circuit, or a radio system employing a single carrier frequency, is used for both directions of transmission between the repeater and an adjacent station, it has hitherto been necessary to time the transmitted and received pulses so that at any station on route, they occur at different times. This imposes retrictions on the repetition frequencies of the pulse trains operating in the two directions, and on the spacing of the stations.

The object of the present invention is to provide a repeater through which pulse trains can be passed simultaneously in opposite directions without imposing any such restrictions.

This object is achieved according to the invention by providing a plurality of parallel paths through which the received pulses corresponding to one direction of transmission are applied to the corresponding amplifier, transmitting the amplified pulses corresponding to the other direction through one of the said paths, and blocking the said paths in turn in such manner that transmitted, pulses are prevented from reaching the said amplifier, the arrangement being such that at least one of the said paths is always open to receive pulses.

The arrangement according to the invention enables pulses to be transmitted simultaneously in both directions through the repeater, and no particular relation is necessary between the pulse durations or repetition frequencies of the pulses transmitted in the two directions.

As will be pointed out, however, later, certain details of the repeater design will be determined by the maximum duration of and minimum separation between, any pulses which it is required to repeat.

There are two types of case which have to be considered, namely: (1) when the same communication medium connects the repeater to the next station in both directions, as for example in the case of a radio system using a single carrier frequency at the repeater; and (2) when different media are used; for example when the repeater is connected to the adjacent stations by separate cables. In this case of course, each cable is used for transmitting pulses in both directions. In case (2), as will be pointed out later, the repeater may be slightly simplified.

The invention will be described with reference to the accompanying drawings in which:

Fig. 1 shows a block schematic circuit diagram of a two-way pulse repeater according to the present invention.

Figs. 2 and 3 respectively show two modifications of Fig. 1;

Figure 1:
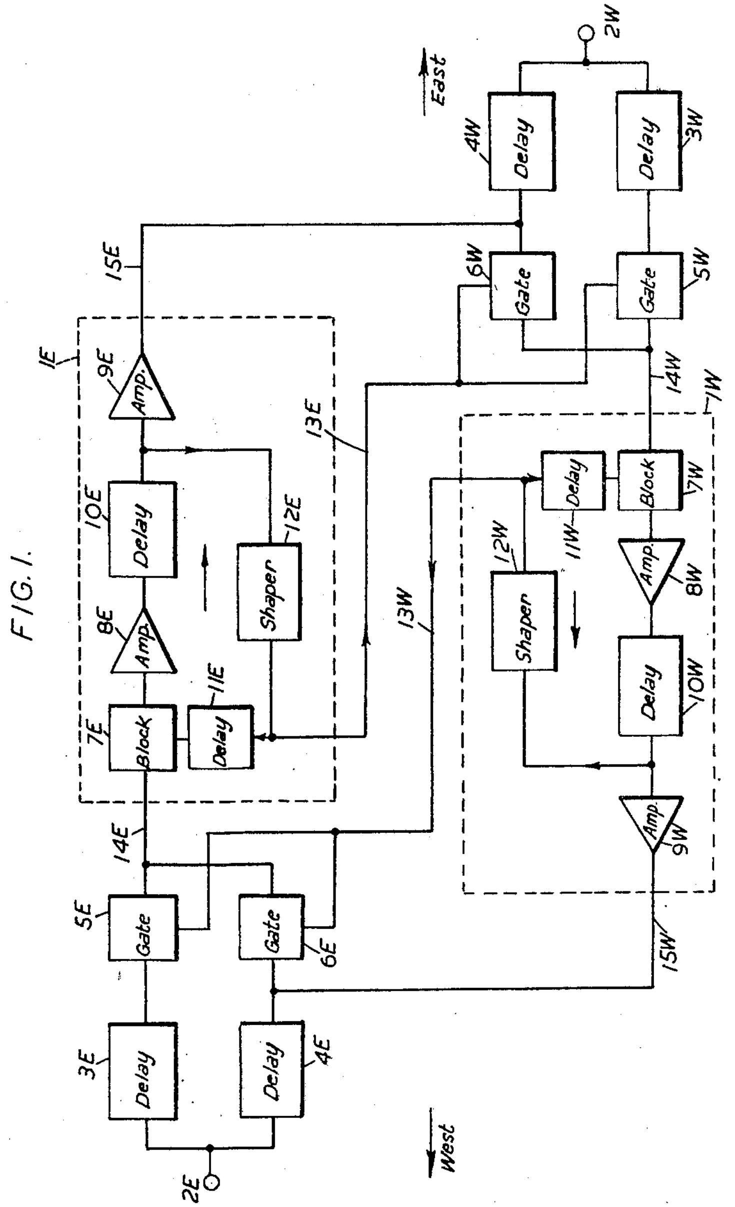

Fig. 1 shows a block schematic circuit diagram of a relatively simple repeater according to the invention. It comprises two similar pulse amplifiers indicated by the dotted outline; 1E and 1W used respectively for repeating pulses to the adjacent stations to the east and west. Pulses from the west station arrive over a transmission circuit common to both directions, which is connected to terminal 2E, which is in turn connected to the amplifier 1E by two parallel paths respectively including delay networks 3E and 4E, and gate circuits 5E and 6E.

The amplifier 1E comprises a blocking circuit 7E followed by a receiving amplifier 8E. The output of the receiving amplifier is connected to the transmitting amplifier 9E through a delay network 10E. A switching pulse from the output of the delay network 10E is applied through a delay network 11E to control the blocking circuit 7E. This pulse should be at least as long as the amplified pulse transmitted by the amplifier 9E and a pulse shaping circuit 12E may be included if necessary to ensure that the switching pulse is long enough to give the blocking circuit time to operate.

The west repeating half of the repeater is identically arranged, and the corresponding elements are given the same designation numbers with the distinguishing letter W.

The outputs of the transmitting amplifiers 9E and 9W are connected respectively to the delay network 4W and 4E as shown, so that the amplified transmitted pulses are delivered through these delay networks and terminals 2W and 2E to the east and west stations, respectively. The switching pulses derived from the outputs of the amplifiers 8E and 8W are applied respectively over conductors 13E and 13W to control the gate circuits 5W, 6W and 5E, 6E. For convenience, the input and output conductors of the amplifiers 1E and 1W will be designated 14E, 15E and 14W, 15W.

The delay networks 3E and 4E should each be designed to delay a pulse by the same amount, which should be slightly greater than half the maximum duration of any pulse which will be transmitted from east to west. Likewise, the delay networks 3W and 4W should each delay a pulse by slightly more than half the maximum duration of any pulse which will be transmitted from west to east. The east and west networks do not need to be equal.

The networks 11E and 11W should each introduce a delay equal to, or slightly less than, that of networks 3E and 4W together, and 3W and 4E together respectively. The networks 10E and 10W may be situated anywhere in the corresponding path between terminals 2E and 2W, the preferred position being shown. These networks are only necessary when the combined delay of networks 3E and 4W is less than the longest pulse transmitted from west to east, and when the combined delay of networks 3W and 4E is less than the longest pulse transmitted from east to west. Each of the networks 10E and 10W should introduce a delay equal to the difference between the duration of the said longest pulse and the combined delay of the corresponding pair of networks 3 and 4 when this difference is positive. If the difference is zero or negative, the corresponding network 10 may be omitted.

Considering first transmission from west to east, the gate circuit 5E is normally closed to prevent any received pulses from reaching the amplifier 1E over the delay network 3E, but the gate circuit 6E normally open so that the received pulses reach the amplifier over the delay network 4E. However, when a transmitted pulse is delivered from the conductors 15W, at the same time a switching pulse is transmitted over conductor 13W and this pulse shuts the gate 6E and opens the gate 5E, so that the received pulses now reach the amplifier 1E over the delay network 3E. The transmitted pulse finds the gate 6E shut and so cannot reach the amplifier 1E. There is also a path for the transmitted pulse through both the delay networks 4E and 3E, but since these together introduce a delay slightly greater than the maximum transmitted pulse, this pulse can never arrive at the gate 5E before this gate is shut again by the disappearance of the switching pulse applied over conductor 13W. Thus the transmitted pulse is prevented from reaching the amplifier 1E by either route. Since the gate 6E opens at the same time as the gate 5E shuts, and vice versa, there will always be a path for the received pulses to the amplifier 1E. If the leading edge of the transmitted pulse arrives during the period of a received pulse, the first position of the received pulse will travel over the delay network 4E and the second portion over the delay network 3E. These two portions will be properly reunited in the conductor 14E if the delay introduced by the networks 3E and 4E is the same.

When the amplified pulses are transmitted from the repeater in both directions over the same medium, the terminals 2E and 2W will be effectively connected together, and there is therefore a path for the pulses transmitted from east to west through the networks 4W and 3E to the input of the amplifier 1E. This path is blocked by the blocking circuit 7E, operated by the pulses from the delay networks 11E. Since the delay introduced by this network is equal to or slightly less than, the combined delay of the networks 3E and 4W, the input to the amplifier 8E is blocked when the pulse arrives over the above mentioned path. Further, since the combined delay of networks 10E and 11E is greater than the duration of the longest pulse transmitted from west to east, the pulse will be received before the receiver is blocked.

It will be understood that the pulses will be repeated from east to west in an exactly similar way.

If separate cables (or different radio carrier frequencies) are used for connection to the east and west stations, the blocking circuits 7E and 7W can be omitted, since the transmitted pulses cannot appear at the input of the amplifier from which they were transmitted.

It should be pointed out that this simple arrangement according to the invention has the limitation that the interval between any two pulses cannot be less than the pulse duration. If this should happen, it can be seen that the first transmitted pulse travelling through networks 4E and 3E may not have had time to disappear before the gate 5E is opened again by the switching pulse corresponding to the next transmitted pulse. This limitation may be avoided by another circuit to be described with reference to Fig. 3.

Figures 2, 5, 6:
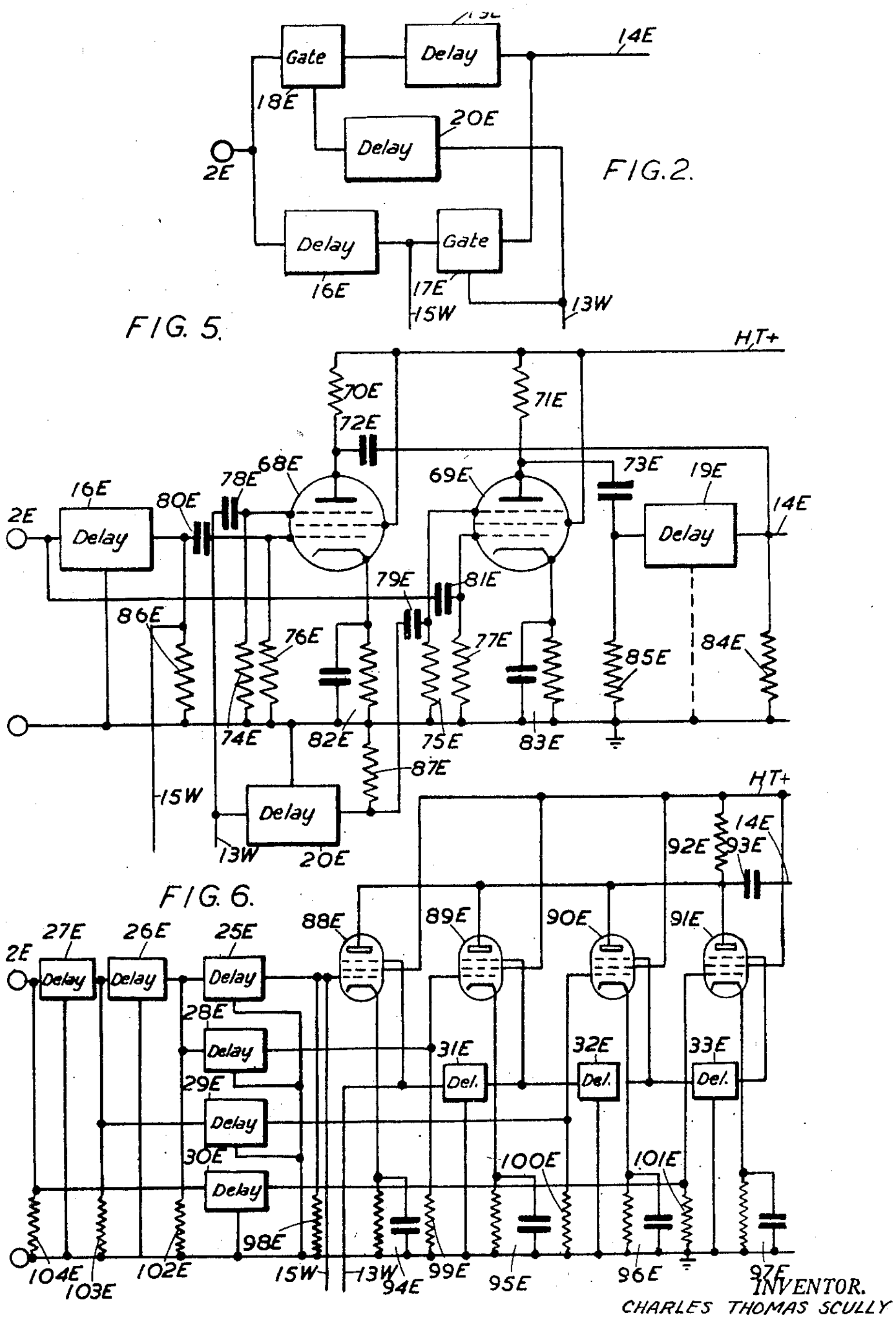
Fig. 5 shows a modification of part of Fig. 4.
Fig. 6 shows a detailed circuit of an arrangement in accordance with Fig. 3.

A modification of the arrangement of Fig. 1 is shown in Fig. 2. This modification only affects the two paths by which the received pulses reach the corresponding amplifiers, and Fig. 2 shows only these paths for the easterly repeating direction, the modification for the other direction being similar.

In Fig. 2, the lower path includes a delay network 16E and agate circuit 17E similar to 4E and 6E of Fig. 1, the gate 17E being normally open. The upper path includes a gate circuit 18E also normally open, followed by a delay network 19E. The gate circuits are controlled by the switching pulses from conductor 13W, which is connected directly to the gate circuit 17E, but through a delay network 20E to the gate circuit 18E. The conductor 15W is connected between the elements 16E and 17E.

The delay networks 16E, 19E, and 20E should all introduce the same delay, which should be slightly greater than the duration of the maximum pulse transmitted from conductor 15W.

In the absence of any transmitted pulses from conductor 15W, both gates are open and the received pulse travels to conductor 14E over both paths. As soon as a transmitted pulse arrives, the gate 17E will be shut by the corresponding switching pulse arriving over conductor 13W. The gate 18E remains open however, and allows any received pulses to pass over the upper path. The switching pulse then shuts the gate 18E, after being delayed by the network 20E, just in time to block the transmitted pulse which has arrived at terminal 2E. Shortly after this time also the trailing edge of the switching pulse will have reached gate 17E and will open it again, so that the next received pulse (or the portion cut off by the shutting of the gate 18E) will find the gate 17E open after passing through the delay network 16E, provided (as in the case of Fig. 1) that the transmitted pulse interval is not greater that the maximum pulse duration.

It will be noted that in this arrangement, the received pulse (or parts of it) may arrive at conductor 14E by either path, or by both paths simultaneously. The amplitude of this pulse may therefore vary, but as in time modulation communication systems, the pulse amplitude is immaterial, this will be no objection, and the pulses may be reduced to uniform amplitude by limiting action, for example, in the amplifier 8E (Fig. 1).

Figure 3:
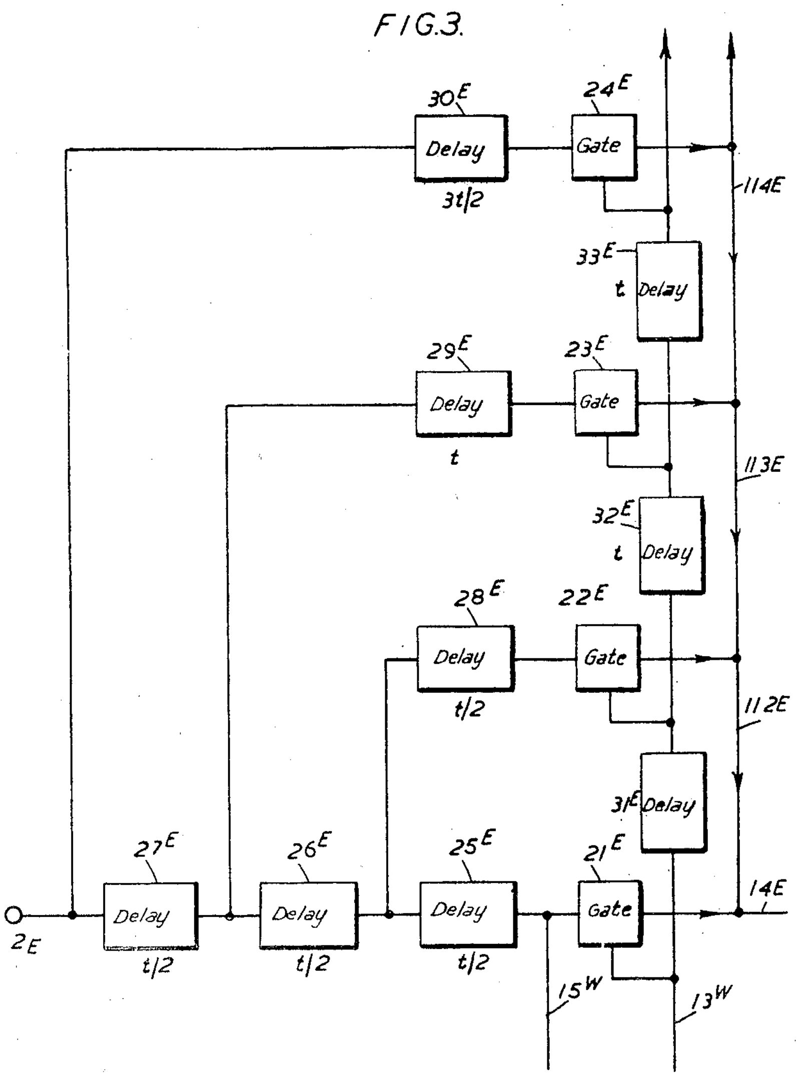

Fig. 3 shows another modification of Fig. 1 which may be adapted for use with pulses of any desired maximum duration and minimum spacing.

Let it be assumed that the maximum pulse duration is T, and that the minimum spacing between pulses is $t$. Then the circuit connecting the terminal 2E to the conductor 14E will comprise $n+1$ parallel paths, where $n$ is the integer equal to or just greater than $T/t$. For illustration Fig. 3 shows a circuit for the case in which $T=3t$, so that $n=3$. The four paths shown include four corresponding gate circuits 21E, 22E, 23E and 24E all of which are normally open for the passage of received pulses. The lowest path comprises three similar delay networks 25E, 26E, and 27E arranged in succession between the terminal 2E and the gate 21E. The second path comprises the delay network 28E connecting the junction point of networks 25E and 26E with the gate 22E. The third and fourth paths comprise the delay networks 29E and 30E connected respectively between the junction point of networks 26E and 27E and the gate 23E, and between the terminal 2E and the gate 24E.

The conductor 13W which conveys the switching pulse is connected to a series of delay networks 31E, 32E, and 33E. The gate circuit 21E is connected directly to the conductor 13W, and the gate circuits 22E, 23E and 24E are connected respectively to the output sides of the delay networks 31E, 32E and 33E.

The conductor 15W conveying the transmitted pulses is connected between the delay networks 25E and the gate 21E.

The delay networks 25E to 28E (inclusive) should be designed to introduce a delay of $t/2$; networks 29E, 31E, 32E and 33E a delay of $t$, and network 30E a delay of $3t/2$.

It will be clear that in the absence of any transmitted pulses all gates are open and the received pulses reach conductor 14E from terminal 2E over all paths simultaneously. Since the total delay is the same over each path, the various components of each pulse combine together in a satisfactory way. As soon as a transmitted pulse arrives over conductor 15W, the corresponding switching pulse shuts the gate 21E and then shuts the gates 22E, 23E, 24E after successive intervals of $t$, $2t$ and $5t$.

The transmitted pulse also reaches these gates after the same intervals through successive pairs of the delay networks and finds all of them shut, so that the transmitted pulse cannot reach the conductor 14E.

However, since $T=3t$, at the time when the gate 24E is shut by the leading edge of the switching pulse the trailing edge will open the gate 21E, thus ensuring that at least one of the four paths is always open for the received pulses. Thereafter the gates open in turn each for a period of $t$, the other three gates remaining shut.

In the above explanation it has been assumed that the shutting and opening of the gates is instantaneous. In practice slight adjustments will be necessary of the duration of the switching pulse and the delays introduced by the delay networks to allow for the operating times of the gate circuits.

It should be noted that the circuit will operate satisfactorily for any pulses for which the pulse duration is less than T and/or the pulse interval is greater than $t$. In this case more than one of the four paths may be open to receive pulses at the same time, but this is no objection, since as already explained, the pulse amplitudes may be made uniform by suitable limitation.

It will be understood, of course, that although Fig. 3 shows the modification only of the east transmitting side of Fig. 1, the west transmitting side will be modified in an exactly similar way.

It will be clear that when $n$ is greater than 3, additional paths may be provided and arranged according to the same plan. One or more additional delay networks will be connected between the terminal 2E and the delay network 27E, and the series of delay networks 31E to 33E will be extended in order to serve the necessary additional gate circuits and corresponding delay networks of the series 8E to 30E. The delay introduced by each additional one of the last mentioned delay networks should increase progressively by $t/2$.

Figure 4:
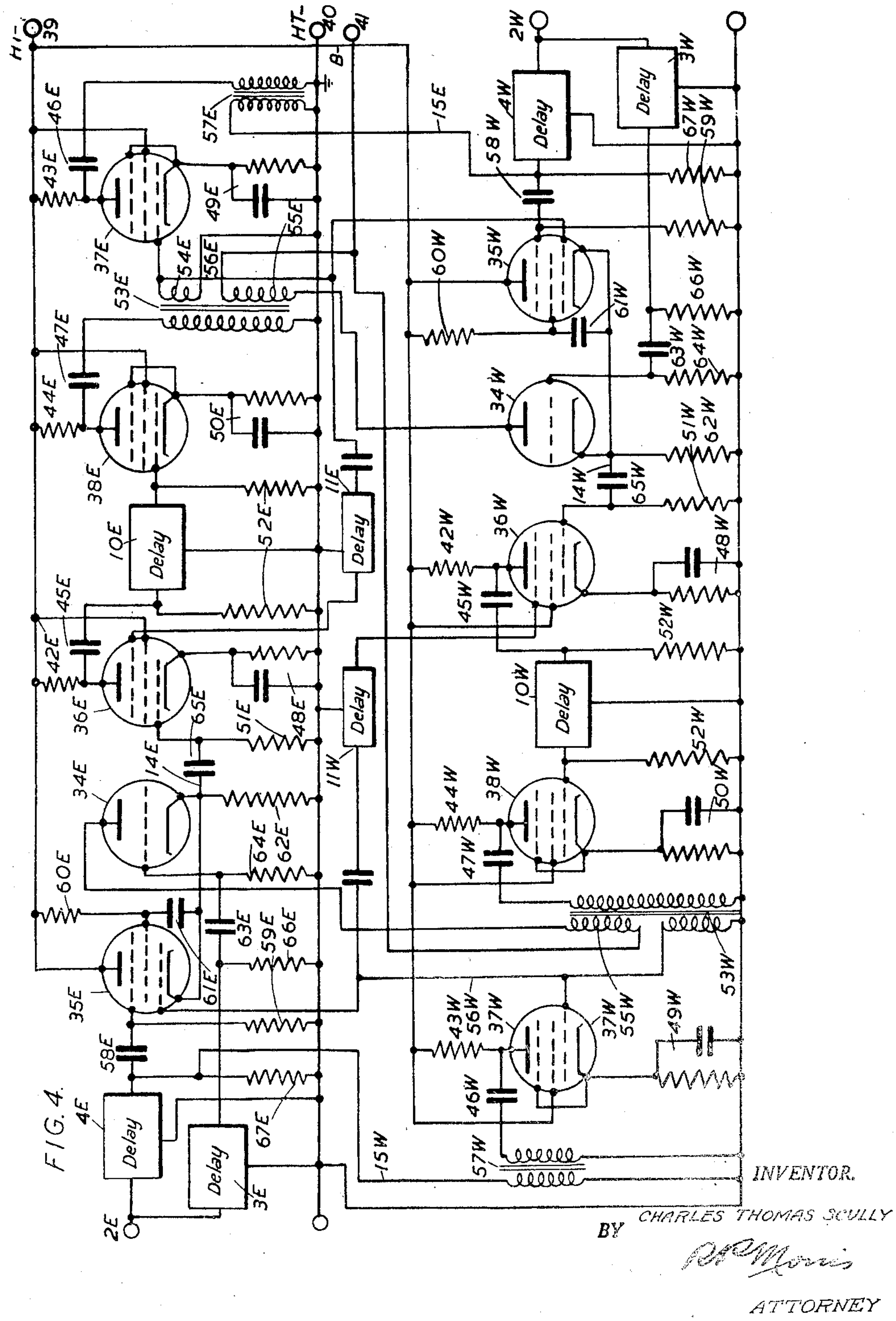
Fig. 4 shows a detailed circuit of a repeater in accordance with Fig. 1.

Fig. 4 shows a detailed circuit diagram of a repeater in accordance with Fig. 1. Those parts of Fig. 1 which are directly identifiable in Fig. 4 have been given the same designation numbers. Only the east transmitting half of Fig. 4 will be described, since the west transmitting half is identical.

The normally shut and open gates 5E and 6E of Fig. 1 are represented respectively by two valves 34E and 35E arranged as cathode followers. The blocking circuit 7E and receiving amplifier 8E are combined in the valve 36E and the transmitting amplifier is represented by the valve 37E; an additional amplifier valve 38E not represented in Fig. 1 is inserted between the delay network 10E and the valve 37E.

Positive and negative terminals 39 and 40 are provided for the high tension source (not shown) for the valves, terminal 40 being grounded as shown. A terminal 41 for a negative bias source (also not shown) is provided.

The usual anode load resistance 42E, 43E and 44E, anode coupling condensers 45E, 46E and 47E and cathode bias networks 48E, 49E and 50E are provided respectively for the valves 36E, 37E and 38E. All these valves have the screen grids connected directly to terminal 39 and valves 37E and 38E have the suppressor grids connected to the cathodes. Grid leak resistances 51E and 52E are provided for the valevs 36E and 38E, and the anode condenser 45E is connected to ground through a resistance 52E.

A transformer 53E is provided for coupling the valves 38E and 37E. This transformer has a first secondary winding 54E connecting the control grid of the valve 37E to ground, and a second secondary winding 55E connecting terminal 41 to the anode of the valve 34W in the other half of the repeater. A conductor 56E connects the control grid of the valve 37E to the suppressor grid of the valve 36E, through the delay network 11E.

This corresponds to the conductor 11E of Fig. 1, but no pulse shaper corresponding to 12E is necessary and is not shown in Fig. 4. The conductor 56E also extends to the control grid of the valve 35W in the other half of the circuit.

The valve 37E is provided with an output transformer 57E the secondary winding of which is connected over conductor 15E to the delay network 4W in the other half of the circuit.

The anode of the gate valve 35E is connected directly to terminal 39, and the suppressor grid is connected to the delay network 4E through a blocking condenser 58E and to ground through a high resistance 59E. The screen grid is polarised through a resistance 60E and is connected to the cathode through a condenser 61E. The control grid is connected to the control grid of the valve 37W in the other half of the circuit through conductor 56W. The cathode shares a cathode resistance 62E with the other gate valve 34E. The control grid of this valve 34E is connected to the delay network 3E through a blocking condenser 63E and to ground through a high resistance 64E. The anode is connected to the secondary winding 55W of the transformer 53W in the other half of the circuit.

The cathodes of the valves 34E and 35E are connected by the input conductor 14E and through a blocking condenser 65E to the control grid of the valve 36E.

The delay networks 3E and 4E are provided with terminating resistances 66E and 67E.

The gate valve 35E should be biassed so that it will normally accept and amplify the received pulses applied in positive sense through condenser 58E. However, transformer winding 54W supplies a switching pulse to the control grid of the valve 35E which coincides with the transmitted pulse delivered over conductor 15W. The transformer should be poled so that this switching pulse is negative, and is of sufficient amplitude to cut off the valve 35E. At the same time a duplicate but positive switching pulse is applied from the winding 55W to energise the valve 34E, which then passes any received pulses, or portions thereof, to conductor 14E. As explained with reference to Fig. 1, the gate valve 35E, being shut, prevents the transmited pulse from reaching the conductor 14E.

The negative bias applied to the winding 55W of the transformer 53W permits the opening of the gate valve 34E to be slightly delayed.

The valves 36E, 38E and 37E act as conventional amplifiers except that the negative switching pulse generated by the winding 54E of the transformer 53E is applied through the delay network 11E to cut off the valve 36E on the suppressor grid, thus preventing the pulse transmitted eastwords from re-entering the amplifier from terminal 2E.

The transformer 57E may be poled so that positive output pulses are delivered to terminal 2W through the delay network 4W.

The delays specified above for the networks 10E and 11E have been chosen in order to give time for the pulse to be completely received before the valve 36E is cut off during transmission of the pulse. If terminals 2E and 2W are connected to separate communication media, then the delay network 10E can be omitted, and no blocking is required in the valve 36E, so that its suppressor grid can be omitted or connected to the cathode instead of to conductor 56E.

The transmitting valve 37W by virtue of its bias, operates for a shorter time and slightly after the valve 35E has been cut off by the negative pulse received by its grid from transformer 53W. Hence, there is no circuit through the valve 35E to valve 36E when a transmitted pulse arrives at valve 35E through networks 3E and 4E. There is, however, a circuit from terminal 2E through the delay network 3E and through valve 34E to valve 36E since this valve has a positive pulse applied to its anode from transformer 53W. Since delay networks 3E and 4E have a time delay equal to the duration of the switching pulse, the valve 34E will have ceased conducting by the time the transmitted pulse arrives at its grid. Simultaneously valve 35E will be unblocked by the disappearance of the negative pulse from its grid. It will be seen, therefore, if terminals 2E and 2W are not connected to the same communication medium, that is, a separate path in either direction is available transmission through the repeater is continuous. If, however, the terminals 2E and 2W are connected to the same medium then through transmission is continuous except during the time each received pulse is being re-transmitted, that is, there must always be a delay in the retransmission of pulses in the same direction equal to or slightly greater than the duration of the pulses.

It has been assumed that all the pulses are positive. The only alteration necessary for negative pulses is to reverse the primary windings of the transformers 53E, 57E, 53W and 57W.

Details of the modification shown in Fig. 2 are given in Fig. 5. This figure replaces that part of the upper part of Fig. 4 which is to the left hand side of the blocking condenser 65E. The lower part of Fig. 4 to the right hand side of condenser 65W will be similarly modified.

The two gate circuits 17E and 18E of Fig. 2 are represented respectively by the two similarly arranged valves 68E and 69E having anode resistances 70E and 71E, anode blocking condensers 72E and 73E, suppressor grid resistances 74E and 75E, control grid resistances 76E and 77E, suppressor grid blocking condensers 78E and 79E, control grid blocking condensers 80E and 81E, and cathode bias networks 82E and 83E. The anode condensers are connected to ground through resistances 84E and 85E, and terminating resistances 86E and 87E are provided respectively for the delay networks 16E and 20E.

The terminal 2E is connected directly to the control grid of the valve 68E. Both these valves should be biased so that they will normally pass the received pulses applied in positive sense at terminal 2E. The conductor 13W (which will be connected to the control grid of the valve 37W in Fig. 4) is connected directly to the suppressor grid of the valve 68E, and through the delay network 20E to the suppressor grid of the valve 69E. The negative switching pulse derives from the transformer 53W should be designed to cut off each of the valves 68E and 69E when it arrives at the corresponding suppressor grid. It will be clear when Fig. 4 is modified according to Fig. 5, the secondary windings 55E and 55W of the transformers 53E and 53W and the bias source connected to terminal 41 are not required. The anode of the valve 68E and the output of the delay networks 19E are connected to the conductor 14E as shown.

Fig. 6 shows details of the modification of Fig. 4 according to Fig. 3. Fig. 6 replaces the position of Fig. 4 between the terminal 2E and the condenser 65E. The lower half of Fig. 4 between the terminal 2W and the condenser 65W may be modified similarly.

In Fig. 6, the delay networks correspond exactly to those of Fig. 3 and are given the same designation numbers. The gate circuits 21E to 24E of Fig. 3 are represented in Fig. 6 by the valves 88E to 91E respectively. These valves are all similarly arranged and share a common anode resistance 92E and output blocking condenser 93E connected to conductor 14E. The valves are provided with cathode bias networks 94E to 97E and grid leak resistances 98E to 101E.

The conductor 13W conveying the negative switching pulse from the control grid of the valve 37W (Fig. 4) is connected to the first of the series of delay networks 31E, 32E and 33E and the suppressor grids of the four valves are connected respectively directly to conductor 13W and to the outputs of these three delay networks. The conductor 15W conveying the transmitted pulse is connected to the control grid of the valve 88E. Terminating resistances 102E, 103E and 104E are provided for the delay networks 25E, 26E and 27E.

The valves 88E to 91E should all be biased so that they will normally accept and amplify positive pulses received from terminal 2E over the corresponding paths and the negative switching pulse should be of sufficient amplitude to cut off any valve which it reaches. It should preferably be arranged so that the switching pulse occurs very slightly earlier and has a slightly greater duration than the corresponding transmitted pulse. It will be clear that this arrangement operates exactly as described with reference to Fig. 3. The circuit may be designed for larger values of $T/t$ than 3 by adding further similarly arranged valves with the necessary extra delay networks as described with reference to Fig. 3.

Figure 7:
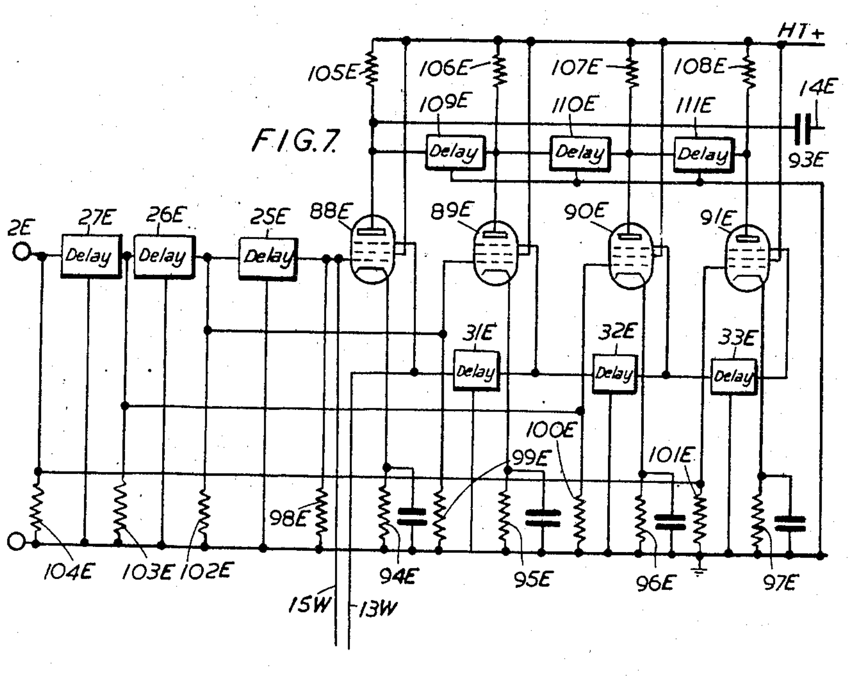
Fig. 7 shows a detailed circuit of an arrangement in accordance with a slightly modified form of Fig. 3.

Fig. 7 shows a modification of Fig. 6 in which the anodes of the valves 88E to 91E are separates, and are provided with individual anode resistances 105E to 108E. The three delay networks 28E, and 29E and 30E of Fig. 6 are omitted and, three corresponding networks 109E, 110E, and 111E are shown in Fig. 7 connecting the anodes of adjacent valves. The input conductor 14E is connected through the blocking condenser 93E to the anode of the first valve 88E. All the delay networks in Fig. 7 should introduce the same delay $t$. It will be evident that the received pulses can reach the conductor 14 through four separate paths each having a delay equal to $3t$. The transmitted pulse arriving over conductor 15W will find the valve 88E blocked by the switching pulse which arrives simultaneously over conductor 13W. On reaching valves 89E, 90E and 91E after successive delays of $t$, $2t$ and $3t$ in networks 25E, 25E+26E, and 25E+26E+27E, the transmitted pulse will find each of the three valves blocked by the switching pulse which reaches these valves after the same delays in networks 31E, 32E and 33E.

The arrangement of Fig. 7 is preferable to that of Fig. 6 since all the delay networks are equal, and moreover, in the case of the networks 109E, 110E and 111E, the anode capacities of the valve may be employed to serve for certain of the delay networks components, or parts of them.

It should be pointed out the Fig. 7 will be in accordance with a slightly modified form of Fig. 3 in which the delay networks 28E, 29E and 30E are removed to positions in series with the conductors marked 112E, 113E and 114E, respectively, in Fig. 3.

In all the embodiments of the invention which have been described so far it has been assumed that the transmitted and received pulses have the same sign. If it is arranged for them to have opposite signs, the circuits may be simplified.

The necessary conditions can be fulfilled in two ways:

(1) By arranging that all the pulses transmitted in one direction through a line of repeaters are positive, while all the pulses transmitted in the other direction are negative. This would require the two amplifiers in each repeater to handle pulses of opposite sign but neither amplifier should invert the pulses.

(2) By designing each amplifier at each repeater to invert the pulses amplified thereby, and by arranging for the input, pulses arriving at any repeater from opposite directions to be of opposite sign. This will result in the pulses transmitted in any direction through a line of repeaters being alternately positive and negative in the successive sections between repeaters.

The methods of designing the amplifiers to fulfill any of these conditions are well known to those skilled in the art and do not need to be described.

Figure 8:
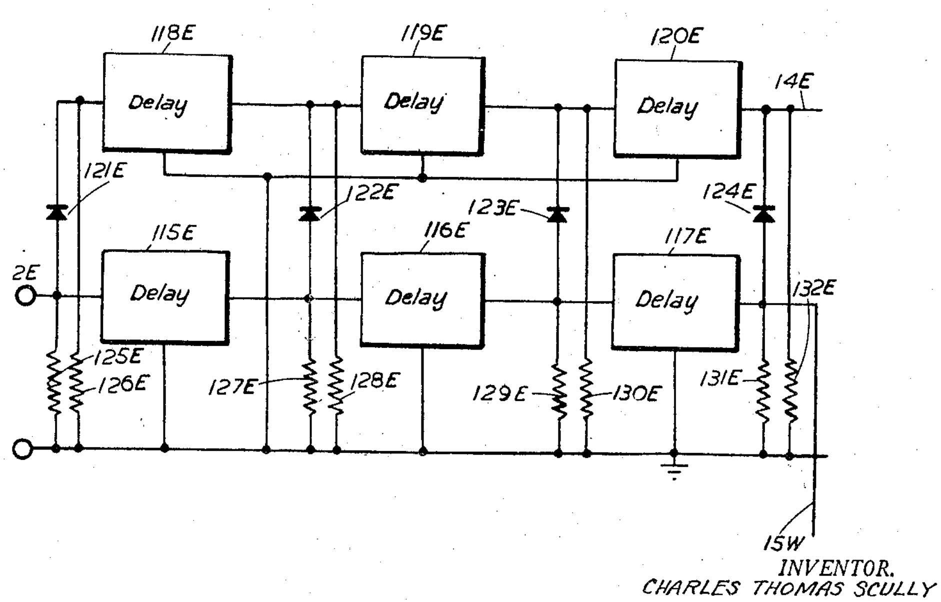
Fig. 8 shows a schematic circuit diagram of still another arrangement according to the invention.

Fig. 8 shows the terminal arrangements at one side of a repeater, and indicates the manner in which the portion to the left hand side of the condenser 65E of Fig. 4 would be modified. The high tension conductor connected to terminal 39 of Fig. 4 is not needed in Fig. 8 and is therefore not shown.

In Fig. 8, the terminal 2E to which the received pulses are applied is connected to the first of a series of three delay networks 115E, 116E and 117E connected in cascade. The input conductor 14E is connected to the output end of a second series of three delay networks 118E, 119E and 120E also arranged in cascade. Four rectifiers 121E, 122E, 123E and 124E connect the input and output sides of corresponding networks of the two series. These are all directed in the same direction and are shown with their anodes connected to the lower series of networks. The resistances 125E to 132E represent terminations for the delay networks. The conductor 15W conveying the transmitted pulses is connected to the output of the delay network 117E. No switching pulses are required, so the conductor 13W and the winding 55W of the transformer 53W (Fig. 4) can be omitted.

Each delay network should be designed to introduce the same delay, namely $t$.

With the rectifiers directed in the manner shown the received pulses should be positive and the transmitted pulses should be negative. When no transmitted pulse is present, the received pulse can pass through each of the four paths connecting terminal 2E to conductor 14E, respectively, including the four rectifiers. Each of these paths has the same delay, namely, $3t$.

As soon as a negative transmitted pulse arrives over conductor 15W it blocks the rectifier 124E, and so is prevented from reaching the conductor 14E. This pulse blocks all the other rectifiers in turn after delays of $t$, $2t$ and $3t$ respectively, but as before, so long as the number of paths is equal to or greater than $1+T/t$, the first rectifier 124E will be unblocked by the time the transmitted pulse blocks the last rectifier, so there is always at least one path open to the received pulses. It will be noted that although transmitted and received pulses may be simultaneously applied to the anode of any rectifier, the transmitted pulse will always have the greater amplitude, so that the rectifier will be definitely blocked.

It will be evident that if the transmitted pulses are positive, and the received pulses are negative, the arrangement of Fig. 8 can be used if all the rectifiers 121E to 124E are reversed.

The rectifiers may be diodes or crystal or metal rectifiers of any suitable type.

When the arrangements are such that as in case (1) mentioned above, all the pulses used for transmission in one direction are positive and all those used for the other direction are negative, it is evident that each repeater will require an arrangement according to Fig. 8 at one end, and a similar arrangement with all the rectifiers reversed at the other end. In case (2) however, in which each amplifier is designed to invert all the pulses which it amplifies every alternate repeater will require arrangements according to Fig. 8 at both ends, while the remainder will require at both ends the arrangement of Fig. 8 with all the rectifiers reversed.

What is claimed is:

1. A two-way repeater for electric pulse transmission systems employing a common transmission medium for two-directional transmission, comprising a pair of pulse amplifiers operative to amplify and retransmit pulses respectively in opposite directions over said transmission medium, a plurality of transmission paths connected from the input of each of said pulse amplifiers to said common transmission medium, means for transmitting outgoing pulses from each of said amplifiers over a circuit including a transmission path of the opposite amplifier, means for blocking said outgoing pulses from said respective amplifier input and means for continually maintaining at least one of said transmission paths to each amplifier open for pulses incoming to said amplifiers.

2. A two-way repeater for electric pulse transmission systems, comprising two similar pulse amplifiers for amplifying and retransmitting pulses respectively in opposite directions, two transmission circuits each operative to convey input pulses for retransmission in one direction and also output pulses transmitted in the opposite direction, a plurality of parallel conductive paths connecting each of said transmission circuits respectively to the input of said pulse amplifiers, means for conveying retransmitted pulses from the output of either of said pulse amplifiers to respective of said transmission circuits over a circuit including a parallel path of said other amplifier, means for preventing access of retransmitted pulses to said other amplifier over any of said parallel paths and means for maintaining a circuit over at least one of said parallel paths open for pulses incoming to each of said amplifiers over said transmission circuits.

3. A repeater according to claim 2 in which each parallel path includes delay means connected therein such that received pulses reach the input of the corresponding amplifier over any of said paths after a same delay, and in which each path also includes a gate circuit which is normally open for the passage of received pulses from said transmission circuits, and further comprising means for deriving a switching pulse from each of said amplifiers the duration of which is at least equal to that of a corresponding retransmitted pulse, and means for applying said switching pulses to close respective of said gate circuits in turn after corresponding delays such that any retransmitted pulse from said amplifiers finds each gate closed in arrival thereat over said parallel paths.

4. A repeater according to claim 3 in which the switching pulse is applied directly to the gate circuit of the path to which the retransmitted pulse is applied, and to the other gate circuits in turn after successive delays increasing by a constant time $t$ which is at least less than the minimum time interval between any two retransmitted pulses.

5. A repeater according to claim 4 in which the number of the said parallel paths is the integer equal to $(T+t)/t$ where T is the maximum duration of any retransmitted pulse.

6. A repeater according to claim 5 in which $(T+t)/t$ is less than 2, and comprising two of the said parallel paths.

7. A repeater according to claim 6 in which each gate circuit comprises a thermionic valve normally operative to transmit pulses applied thereto, and in which means is provided for applying said switching pulses in negative sense to a grid electrode of the said valve in order to block it.

8. A repeater according to claim 2 including two parallel paths connecting each transmission circuit to the corresponding amplifier over either path after a predetermined delay, in which one of the paths includes a first gate circuit normally open for the passage of received pulses, and the other includes a second gate circuit normally closed for received pulses, comprising means for deriving switching pulses from the said other amplifier the duration of which is at least equal to that of a corresponding retransmitted pulse, and means for applying the switching pulses to close said first gate circuit and to open said second gate circuit.

9. A repeater according to claim 8 in which the first gate circuit comprises a thermionic valve arranged normally to transmit pulses applied thereto, and in which means is provided for applying a switching pulse in negative sense to a grid electrode of the said valve in order to block it.

10. A repeater according to claim 9 in which the second gate circuit comprises a thermionic valve, and which means is provided for applying a switching pulse in positive sense to the anode thereof for providing the operating potential.

11. A repeater according to claim 2 in which each of the said parallel paths includes a gating valve comprising means for applying pulses received over said transmission circuits to the said gating valves over respective delay means all introducing the same delay, means for connecting the outputs of all the gating valves directly to the said corresponding amplifier, and means for applying a switching pulse in negative sense to a grid electrode of the gating valve in the path to which the transmitted pulses are applied, and to a grid electrode in each of the remaining gating valves after progressively increasing delay.

12. A repeater according to claim 2 in which each of the said paths includes a gating valve, comprising means for applying pulses received over said transmission circuits to the first gating valve in the path to which the transmitted pulses are applied after a given delay, and to the other gating valves after progressively decreasing delay, means for connecting the outputs of all the gating valves to the said corresponding amplifier after progressively increasing delays such that the total delay obtained in reaching the said corresponding amplifier is constant, and means for applying switching pulses directly to a grid electrode of the first gating valve, and to a grid electrode in each of the remaining valves after progressively increasing delay.

13. A repeater according to claim 1 in which the said plurality of transmission paths comprises two series each consisting of the same number of delay devices arranged in cascade, corresponding devices of each series introducing the same delay, a plurality of rectifiers, one which connects the input of each delay network of one series to the input of the corresponding delay network of the other series, means for supplying pulses received over said common transmission medium of one sign to the input of one of the said series and transmitted pulses of the opposite sign to the output thereof, and means for connecting the output of the other series to the said amplifier connected to said transmission paths.

CHARLES THOMAS SCULLY.

REFERENCES CITED

The following references are of record in the file of this patent:

UNITED STATES PATENTS

| Number | Name | Date |
|---|---|---|
| 1,829,783 | Chestnut et al. | Nov. 3, 1931 |
| 2,429,613 | Deloraine et al. | Oct. 28, 1947 |